US006439863B1

(12) United States Patent
McKay

(10) Patent No.: US 6,439,863 B1
(45) Date of Patent: Aug. 27, 2002

(54) FUEL PUMP WITH VAPOR LOCK INHIBITING CHECK VALVE

(75) Inventor: Michael Leonard McKay, Kardinya (AU)

(73) Assignee: Orbital Engine Company (Australia) Pty. Limited, Balcatta (AU)

(*) Notice: Subject to any disclaimer, the term of this patent is extended or adjusted under 35 U.S.C. 154(b) by 0 days.

(21) Appl. No.: 09/764,997

(22) PCT Filed: Jul. 23, 1999

(86) PCT No.: PCT/AU99/00601

§ 371 (c)(1), (2), (4) Date: Jan. 23, 2001

(87) PCT Pub. No.: WO00/06890

PCT Pub. Date: Feb. 10, 2000

(30) Foreign Application Priority Data

Jul. 24, 1998 (AU) ............................................ PP4843

(51) Int. Cl.[7] ......................... F04B 39/10; F04B 17/00; F04B 49/00; F16T 1/20; F16K 15/00

(52) U.S. Cl. ...................... 417/571; 417/415; 417/298; 137/199; 137/533.11

(58) Field of Search ............................... 417/415, 571, 417/298; 137/199, 533.11

(56) References Cited

U.S. PATENT DOCUMENTS 3,220,351 A * 11/1965 Kling .................... 137/533.11
3,250,225 A * 5/1966 Taplin ..................... 417/413.1
4,068,680 A * 1/1978 Sliger ...................... 137/493.2
4,489,744 A * 12/1984 Merrill ...................... 137/202
4,825,897 A * 5/1989 Shade ........................ 137/271
5,135,366 A * 8/1992 Ribeiro ....................... 137/199
5,253,668 A * 10/1993 Mills ........................... 137/12
6,247,487 B1 * 6/2001 Skill .......................... 137/198

FOREIGN PATENT DOCUMENTS

FR 2 448 637 2/1980 ............ F02M/7/08
GB 1 600 363 10/1981 ........... F04B/49/00
GB 2 174 152 10/1986 .......... F02M/37/20
JP 9-250417 * 9/1997 .......... F02M/37/10

* cited by examiner

*Primary Examiner*—Charles G. Freay
*Assistant Examiner*—Timothy P. Solak
(74) *Attorney, Agent, or Firm*—Arent Fox Kintner Plotkin & Kahn, PLLC

(57) ABSTRACT

A fuel pump designed to prevent vapor lock. The pump comprises an inlet check valve located between a pumping chamber and a reservoir. The inlet check valve allows the flow of fluid from the reservoir into the pumping chamber. The inlet check valve is constructed such that when a combination of both liquid and vapor is present in the pumping chamber, the liquid and vapor is allowed to flow from the pumping chamber back into the reservoir; but when the pumping chamber is filled only with liquid, the inlet check valve prohibits flow from the pumping chamber into the reservoir.

35 Claims, 3 Drawing Sheets

FUEL PUMP WITH VAPOR LOCK INHIBITING CHECK VALVE

The present invention is directed to a pump for supplying liquid to a source and is particularly directed to, but not limited to, a fuel pump for supplying fuel for use in an internal combustion engine. The fuel pump is applicable for use with a fuel injection system used in motorcycle engines and the present invention will be described with reference to this application. It is to be appreciated that the pump is also applicable for use in other applications, particularly where priming of the pump is a concern.

Fuel injection systems for internal combustion engines typically require a fuel pump to supply fuel to the fuel and/or delivery injectors of the injection system. When the fuel supply to the fuel pump is interrupted and the remaining fuel in the pump is pumped out, it is necessary to re-prime the fuel pump. Typically, it can take a number of seconds to re-prime a fuel pump because of the presence of air and/or fuel vapour upstream of and within the fuel pump. Generally, this gas must be removed before the fuel pump can operate properly.

A similar problem also exists when the fuel to be delivered by the fuel pump is at a high temperature in a fuel tank, from which fuel is supplied to the fuel pump. At such significantly high temperatures, vapour typically forms and may constitute a significant amount of the fuel volume presented to the fuel pump. This problem is commonly known as "hot fuel handling" and for the fuel pump to operate properly this fuel vapour or gas must also be removed, from the vicinity of the fuel pump.

One way of removing such gas or vapour present upstream from or within the fuel pump is by pumping the gas downstream of the fuel pump, the gas, for example, being subsequently returned to the fuel tank by a fuel regulator. In this scenario it is however difficult for the fuel pump to pump a compressible gas or vapour as it may tend to simply compress and expand within the pump without being displaced therefrom. This results in a significant period of time being taken to displace the gas from the pump before fuel can be supplied to the fuel injection system. Further, in such pumps it may be difficult to achieve a sufficient compression ratio to pump air against a significant back-pressure downstream of the pump. Such a back-pressure may, for example, be presented by a downstream pressure regulator. In particular regard to the Applicant's dual fluid fuel injection system such as that disclosed in U.S. Pat. No. 4,934,329, the contents of which are incorporated herein by reference, this problem may be more prevalent in that it may present an absolute downstream pressure in the range of 750 kPa, whereas a conventional manifold injection system may present a pressure of only 380 kPa, or thereabouts.

One possible solution is the use of a pump having a higher compression ratio which will more effectively facilitate the pumping of gas or vapour downstream of the fuel pump. However, in regard to simple, low cost fuel systems and/or engine applications, this in itself poses a problem from the point of view of achieving a desired low-cost manufacture of the fuel pump. An additional problem is that the power requirements of commercial pumps having the required high compression ratio are generally too high for simple low cost engine applications such as motorcycle or scooter applications.

It is therefore an object of the present invention to provide a pump, and in particular a fuel pump which can be re-primed after an interruption in, or the exhaustion of, the supply of fuel thereto within a shorter period of time than for known fuel pumps, particularly where comparatively high pressures are to be developed.

It is a further object of the present invention to provide a pump and in particular a fuel pump, which has good hot fuel handling capabilities.

With this in mind, there is provided a pump, for pumping fluid including:

a pump body having a pumping chamber therein;

an inlet control means adapted to be in fluid communication with a fluid supply means for supplying fluid to the pump;

and an outlet control means adapted to control the delivery of fluid from the pump;

wherein when a fluid at least substantially consisting of gas or vapour is supplied to the pumping chamber through the inlet control means, the fluid is pumped upstream from the inlet control means, and when a fluid at least substantially consisting of liquid is supplied to the pumping chamber through the inlet control means, the fluid is at least substantially pumped through the outlet control means.

Preferably, the pump is a fuel pump arranged to receive fuel from a fuel supply means and to pump fuel through the outlet control means. Further the pump has good "hot fuel handling" capability in that it has the capacity to reject vapour continuously during steady state operation.

The pump according to the present invention is designed to not pump gas, typically in the form of air or vapour, downstream of the pump when such gas is presented to the inlet control means as a significant component of the fluid to be pumped. Any such fluid comprising a significant gas component which enters the pump is instead made to pass back through the inlet control means towards the fluid or fuel supply means. As will be alluded to hereinafter, the gas component within the fluid which enters the pumping chamber is gradually reduced until the gas no longer forms a significant component of the fluid. This point is achieved when the effective compression ratio within the pumping chamber is sufficient to overcome the back-pressure downstream of the outlet control means. At this point in time, the fluid within the pumping chamber will be pumped through the outlet control means. The fluid will be substantially liquid, but under certain conditions may still comprise a small component of gas therein, typically 5% by volume or less.

The pump according to the present invention is therefore effectively self priming and separates any gas from the fluid such that at least substantially only liquid is pumped through the outlet control means. This results in faster re-priming times for the pump, and when applied to fuel pumps for internal combustion engines, allows a high enough effective compression ratio, due to liquid rather than air being in the pumping chamber, which allows pumping against a high back-pressure downstream of the pump.

The inlet control means may include an inlet control member for controlling the flow of fuel and/or gas to and from the pumping chamber. The inlet control member may be accommodated within an inlet bore having an inlet port at one end thereof, and an end stop face at an opposing end thereof. The inlet control member may be freely moveable within the inlet bore between the inlet port and the end stop face of the bore. At least one inlet discharge passage may extend between the end stop face of the inlet bore and the pumping chamber to allow the flow of fluid to and from the inlet bore and the pumping chamber. The discharge passage (s) may be offset relative to the central position of the inlet control member such that fluid flow though the passage(s) may still occur when the inlet control member abuts the end stop face.

The inlet control member may be spherical in shape and the inlet port may be provided with a valve seat upon which the inlet control member can abut to close off the inlet port preventing fluid flow through the inlet bore. It is however to be appreciated that alternative shapes of the inlet control member are also envisaged. For example, the inlet control member may alternatively be disc shaped.

A predetermined clearance may be provided between the internal walls of the inlet bore and the inlet control member. Further, a predetermined axial travel or “stroke” for the inlet control member within the inlet bore may also be provided. The clearance and the stroke may be a function of the diameter of the inlet control member, this function allowing the inlet control means to operate according to the present invention. According to one preferred embodiment, the diametrical clearance is equal to one tenth the diameter of the inlet control member.

An inlet filter screen may be provided within an inlet duct of the inlet control means upstream of the inlet port and downstream of the fuel supply means.

The pump may further include a fluid discharge means for delivering fluid which is pumped through the outlet control means to a desired source. The outlet control means may include a check valve means responsive to the pressure in the pumping chamber for controlling the flow of fluid from the pumping chamber.

The pump may include a piston located within the pumping chamber. The piston may be actuated by an eccentrically mounted cam. A bearing means may be provided about the cam for engaging one end of the piston. The bearing means may, for example, be provided in the form of a sleeve bearing on a follower supported on or integral with the piston. The eccentric cam may be driven by an electric motor. Alternatively, the piston may be actuated by a linear actuator responsive to engine operating variables.

As compared to a conventional roller cell type fuel pump, the above described arrangement utilises an electric pump having lower power requirements due to the lower pump leakage between high and low pressure regions in the pump. This allows a fuel pump according to the present invention to be used more effectively on motor-scooters and other small engine applications.

Where the pump is a fuel pump, the fluid supply means may be a fuel reservoir, and an upstream supply line may connect the inlet control means via the inlet duct to the fuel reservoir. The upstream supply line may be directly submerged within the fuel reservoir or may be comprised by a hose connected to a fuel reservoir located directly above the fuel pump. Preferably, the fuel pump may be entirely submerged within the fuel reservoir and may draw fuel from the upstream fuel supply line. The fuel pump may then subsequently deliver high pressure fuel via the fluid discharge means to a downstream fuel supply circuit located externally of the fuel reservoir.

Depending on the position of the inlet control member within the inlet bore, the inlet port will be selectively closed off or will be opened to allow fuel and gas to pass through the inlet port and through the inlet discharge passage(s) to the pumping chamber. The axial travel, mass and diameter of the inlet control member, together with the clearance in the containing inlet bore, define the selected response of the inlet control member relative to the selected fluid velocities developed as a result of the pressure and volumetric conditions in the pumping chamber.

As a result, fluids with a lower average specific gravity and viscosity, such as fuel containing air or vapour, are ejected at high velocity upstream of the fuel pump past the inlet control member, the inlet port and the inlet filter screen. The velocity of the fluid pumped through the inlet control means is dependent upon the amount of gas compared to liquid that there is in the fluid. Generally, as the component of gas within the fluid is gradually reduced, the fluid is pumped past the inlet control member with greater velocity. The velocities of the fluid are typically sufficient to overcome the surface tension on the surface of the inlet filter screen which would normally prevent air or vapour from passing in the direction away from the pumping chamber due to buoyancy forces alone.

The axial proximity of the inlet filter screen relative to the inlet port, on the one hand, and the bore size of the inlet port, on the other hand, are selected in relation to the displaced volume per stroke in the pumping chamber during one cycle in order to provide the minimum required velocity of ejection through the inlet port so as to ensure that air and vapour pass through the inlet filter screen in the upstream direction. Thereby, entrained air and vapour are ejected into a low-velocity region of the inlet duct such that buoyancy and bubble coalescence forces may act to remove such air and vapour from the inlet duct. Such vapours and gases may pass back to the fuel within the fuel reservoir due to the buoyancy forces and the lack of velocity of the fuel in the downstream direction within the inlet duct, such velocity being selected by the diameter of the inlet duct relative to the average rate of liquid pumping provided by the motor and pumping chamber during normal steady-state operation.

Conversely to the above, when fluids without a significant percentage of entrained air or fuel vapour are drawn in to the pumping chamber of the fuel pump, the effective compression ratio within the pumping chamber is sufficient to overcome the check valve means of the outlet control means and the back-pressure downstream of the outlet control means. Hence, when predominantly liquid is present in the pumping chamber, the pump is able to effectively pump this liquid, typically fuel, to the fluid discharge means via the outlet control means.

The actual behaviour of the inlet control member within the inlet bore as noted above is a function of the specific gravity and viscosity of the fluid passing through the inlet control means relative to the cyclic volume flow conditions created by the pumping chamber. During operation of the fuel pump, and particularly when fluid which is substantially gaseous by volume is present in the pumping chamber, the inlet control member “oscillates” within the inlet bore due to the periodic changes in the direction of fluid flow through the inlet bore. The phase and amplitude of this oscillation varies as a function of the specific gravity and viscosity of the fluid passing around the inlet control member. This periodic change of direction of fluid flow is due to the piston moving through its pumping and return strokes and hence cyclically changing the volume and pressure within the pumping chamber.

When the fluid within the pumping chamber is at least substantially gas, the oscillation of the inlet control member is substantially “out of phase” with the frequency of the direction change of the fluid passing through the inlet bore. The net result is that the check valve of the outlet control means stays closed and gas/vapour entrained in liquid passes in and out of the pumping chamber, past the control member and the inlet port. As the gas and/or vapour which are entrained in the liquid are forced back and forth between the pumping chamber and the upstream inlet duct, some of the vapour or gas is sufficiently removed to a point upstream of the inlet port such that it may coalesce into bubbles large enough to rise by buoyancy forces against the relatively low downstream fluid velocity in the inlet duct. This gas or vapour is replaced by liquid in the pumping chamber and the inlet bore. Accordingly, gas or vapour present in the fluid is effectively separated from the relatively high velocity fluid in the pumping chamber and the inlet bore. This continues to happen until the component of gas by volume within the fluid in the pumping chamber is reduced to a point where it is no longer significant such that the amount of liquid in the pumping chamber eventually becomes sufficient to allow the effective compression ratio for pumping through the outlet control means to occur.

Whilst this priming phase of operation is occurring, the phase of oscillation of the inlet control member varies progressively closer to the phase of fluid movement as the average specific gravity and viscosity of the fluid increases. When the fluid is at least substantially liquid, the movement of the inlet control member generally moves in phase with the fluid flow through the discharge passage(s) such that the inlet port is selectively blocked by the inlet control member. The fluid is therefore prevented from returning to the inlet duct and fuel reservoir and is instead able to displace the check valve of the outlet control means and be pumped downstream from the pump. Since the effective compression ratio within the pumping chamber is such that pumping through the outlet control means can occur whilst there is still a small component of gas within the fluid in the pumping chamber, the pump may, under certain circumstances, deliver this small component of gas with the liquid through the outlet control means. However, under most circumstances, the fluid will generally be primed of all gas by the operation of the pump such that only liquid fuel will be delivered thereby.

It will be convenient to further describe the invention by reference to the accompanying drawings which illustrates one possible arrangement of a fuel pump according to the present invention. Other arrangements of the invention are possible, and consequently, the particularity of the accompanying drawings is not to be understood as superseding the generality of the preceding description of the invention.

Figure 1:
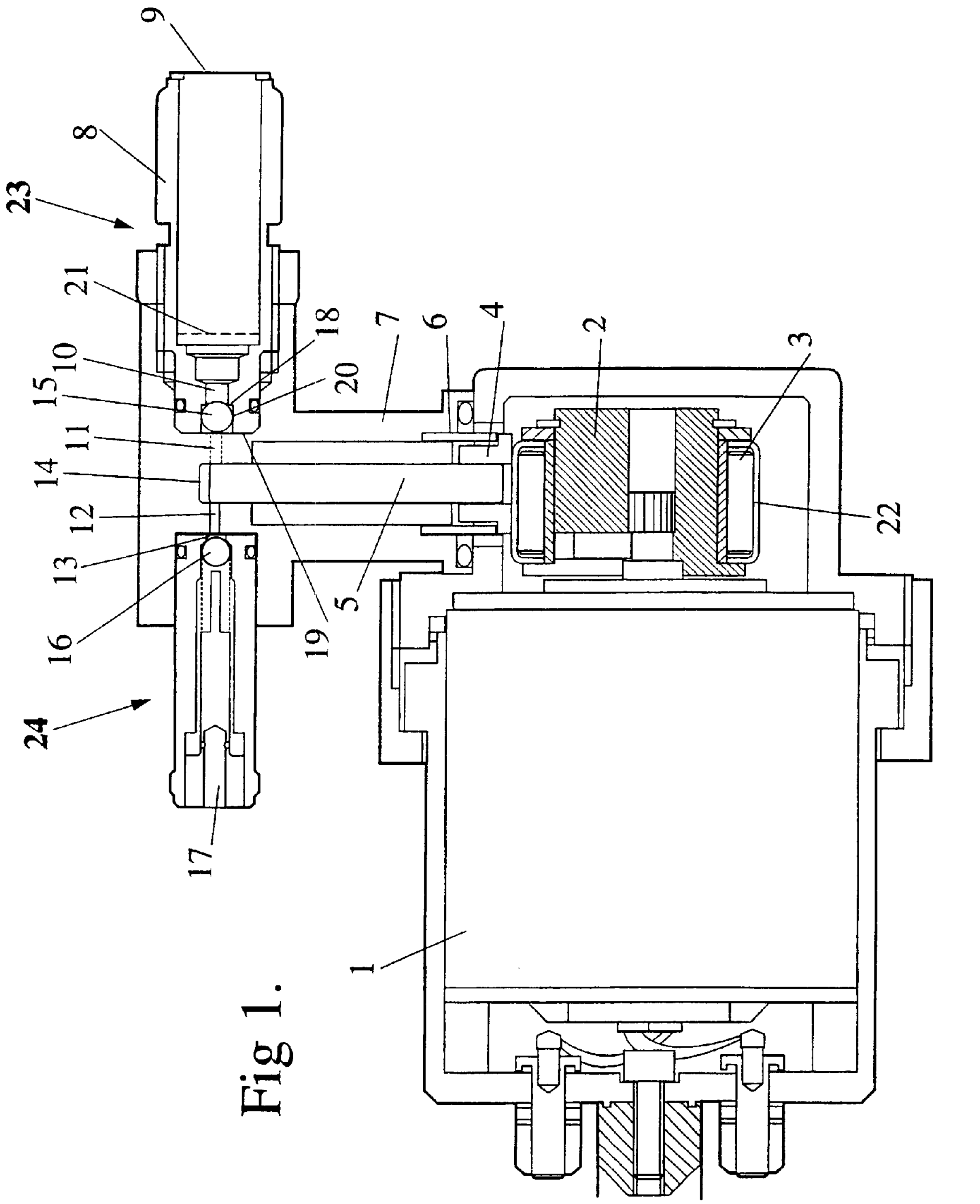
FIG. 1 is a cross-sectional view of a fuel pump according to the present invention.

Referring initially to FIG. 1, the fuel pump includes a pump body 7 within which is located a piston 5. The piston 5 is driven for movement by an eccentrically mounted cam 2, the cam 2 being driven by an electric motor 1. A sleeve bearing 3 is supported on the cam 2 and a follower member 4 supported on one end of the piston 5 engages an outer race 22 of the sleeve bearing 3. A spring 6 urges the follower member 4 against the outer race 22 so that the follower member 4 remains substantially always in contact with said outer race 22. The piston 5 is then driven for reciprocal movement by the rotation of the cam 2. The other end of the piston 5 is located within a pumping chamber 14 provided in the pump body 7. The fluid supply to the pumping chamber 14 is controlled by means of an inlet control means 23, and the fluid pumped from the pumping chamber 14 is delivered through an outlet control means 24.

The inlet control means 23 includes an inlet duct 8 which is in fluid communication with a fuel reservoir (not shown) via inlet 9 supplying fuel to the fuel pump. At one end of the inlet duct 8 there is provided an inlet bore 20 within which is located an inlet control member 15. An inlet port 10 is provided at one end of the inlet bore 20 remote from the pumping chamber 14 with an end stop face 19 being provided at the opposing end of the inlet bore 20. A sealing seat 18 is provided about the inlet port 10 to allow the inlet control member 15 to abut the sealing seat 18 and block fluid flow through the inlet port 10. At least one inlet discharge passage 11 is provided between the pumping chamber 14 and the inlet bore 20 to allow fluid to be transferred between the inlet bore 20 and the pumping chamber 14. An inlet filter screen 21 is provide upstream of the inlet port 10, typically within the inlet duct 8.

The inlet control member 15 is spherical in shape, and is freely moveable within the inlet bore 20. The mass of the inlet control member 15, the clearance between the inlet control member 15 and the inlet bore 20 and the actual travel of the inlet control member 15 is selected relative to the diameter of the inlet control member 15 to allow the inlet control means 23 to operate in the manner hereinbefore described, given a selected rate of change of cyclic volumetric flow provided by the pumping chamber 14.

A discharge transfer passage 12 is provided between the pumping chamber 14 and the outlet control means 24. The outlet control means 24 includes a discharge port 13 and a check valve 16 for controlling the flow of fluid through the discharge port 13. The outlet control means includes a discharge duct 17 connected to a downstream fuel supply circuit (not shown).

Figure 2A:
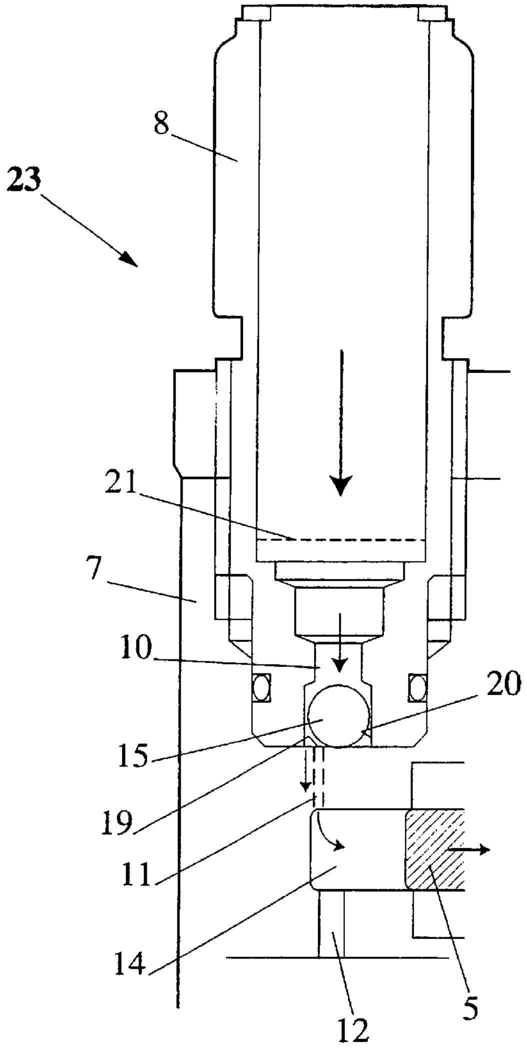
FIGS. 2*a* and 2*b* are detailed cross-sectional views of the inlet control means of the fuel pump of FIG. 1 showing its operation when the fluid being pumped is at least predominantly liquid.
Figure 2B:
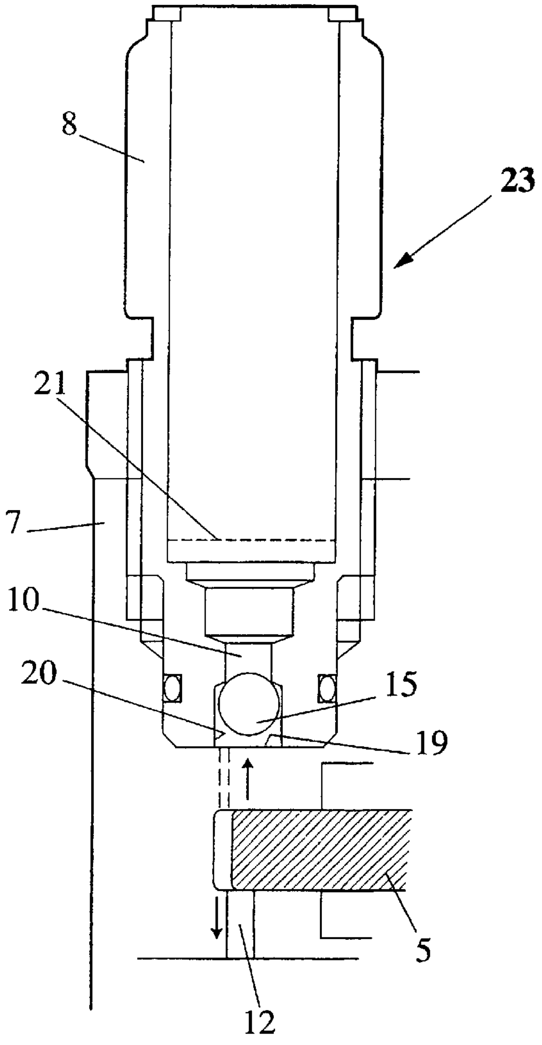
Figure 3A:
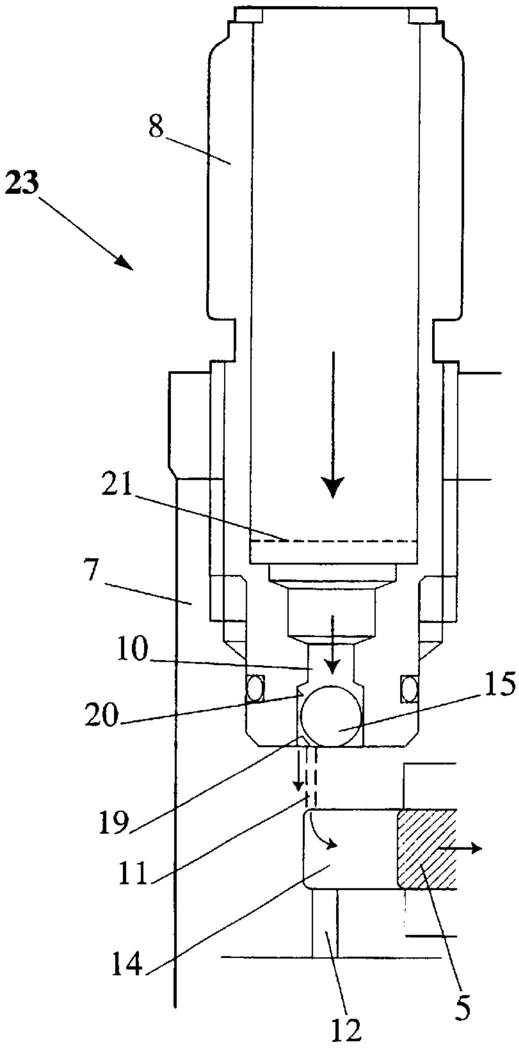
FIGS. 3*a* and 3*b* are detailed cross-sectional views of the inlet control means is of the inlet control means of the fuel pump of FIG. 1 showing its operation when the fluid being pumped is at least predominantly gas and/or vapour.
Figure 3B:
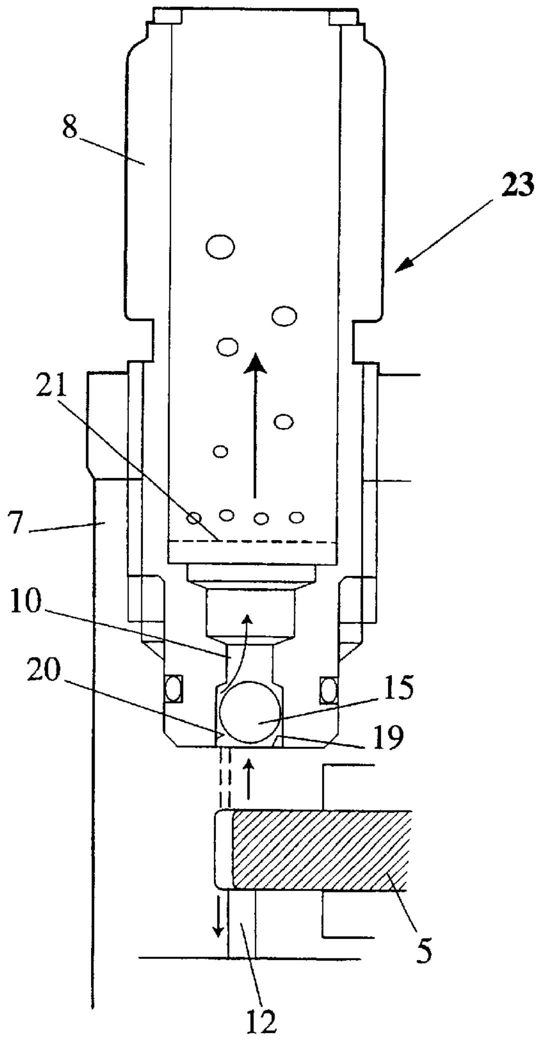

FIGS. 2*a* and 2*b* show the operation of the inlet control means 23 when the piston is undergoing a suction stroke and a pumping stroke respectively when the fluid being pumped is at least predominantly liquid. FIGS. 3*a* and 3*b* similarly show the operation of the inlet control means 23 during a suction and pumping stroke respectively of the piston, the fluid being pumped being however at least predominantly gas and/or vapour. The various arrows in FIGS. 2*a* to 3*b* indicate the general directions of fluid flow in each situation.

The fuel pump as described above operates in the following manner:

- if a fluid predominantly comprising gas and/or vapour is supplied to pumping chamber 14, the action of the piston 5 causes the fluid predominantly comprising gas to be ejected back through the inlet port 10 as shown in FIG. 3*b*. This is because the inlet control member 15 is made to oscillate out of phase with the fluid passing in and out of the pumping chamber 14.
- As the amount of liquid in the fluid being supplied to the pumping chamber 14 increases, the fluid continues to be ejected back through the inlet port 10. The fluid is however ejected further along the duct 8 resulting in most or all of the gas portion of the fluid flowing back to the fuel reservoir under buoyancy forces.
- Once the fluid supplied to the pumping chamber 14 is predominantly or entirely liquid, that fluid is pumped from the pumping chamber 14 out through the discharge control means 24 as shown in FIG. 2*b*. This is because the inlet control member 15 is now generally oscillating in phase with the fluid passing through the inlet port 20.

The following four sets of ratios, "A", "B", "C" and "D" concomitantly define the operating parameters for the pump when pumping fluids with a specific gravity lying between 0.5 and 1, assuming cyclic actuation of the pumping chamber 14 at a volumetric rate which is equivalent to sinusoidal actuation at frequencies lying in the range of 10 to 100 Hertz. In this regard it is to be noted that petrol has a typical specific gravity of around 0.7. Further it should be noted that it is not necessary that the pumping chamber 14 be actuated sinusoidally and continuously. Rather, the typical rate of change of volume of the pumping chamber 14 is the functional parameter alluded to above.

(A) THE SCALE OF THE INLET CONTROL MEMBER 15 RELATIVE TO THE CYCLIC VOLUME PUMPED PER STROKE

The volumetric change of the pumping chamber 14 per stroke event, minimum to maximum or maximum to minimum, respectively, relative to the theoretical volume swept by the inlet control member 15 per corresponding stroke event in travelling between limiting positions is in the ratio of, typically, twenty to one. That is, the cyclic variation in fluid volume pumped in the pumping chamber 14 is typically twenty times the theoretical volume swept by the inlet control member 15 during the corresponding stroke event. Thus, the typical ratio is twenty to one. However, the ratio can for example vary between the limits of five and fifty, with an optimum value lying midway between these values. Concomitantly, the clearance around the inlet control member 15 is as outlined in the following paragraph.

(B) THE CLEARANCE AROUND THE INLET CONTROL MEMBER 15

The projected area of the inlet control member 15 presented perpendicularly to the direction of the flow of fluid, relative to the projected area of flow presented by the clearance around the inlet control member 15 is typically five to one. That is, s the ratio is typically five. The ratio may however vary in the range of two to twenty, with an optimum value lying at around five.

It is to be noted that the area ratio admits a range of geometrical arrangements which will lead to an alternative functional inlet control member 15 and inlet port 10. That is, it is not strictly necessary that the inlet control member 15 be circular. However, for a circular member, the following is relevant.

Stated in terms of linear dimensions rather than area, for the particular case of a circular inlet control member 15 in a circular inlet bore 20 defining a circular clearance diameter, the ratio of the diameter of the inlet control member 15 relative to the diametral clearance is typically ten. However, the ratio can for example vary between five and fifty, with an optimum ratio of around ten.

(C) THE MASS OF THE INLET CONTROL MEMBER

The mass of the inlet control member 15 must be such that when liquid is displaced to and from the pumping chamber 14, the member is substantially responsive to the flow and is in phase with the direction of the flow. When the fluid is substantially a gas or vapour, the inertia of the inlet control member 15 must be sufficiently great to resist the flow and to be out of phase with the direction of the flow for at least part of the time during operational cycle.

During normal operation where the fluid is substantially liquid, the ratio of the pressure forces tending to actuate the inlet control member 15 must be similar to the inertia forces required to accelerate the inlet control member 15 between the limiting axial positions defined by the inlet port 10 and the end stop 19. This is in relation to the selected volumetric rate of change of the pumping chamber. Otherwise he volumetric efficiency of the pump will be slow.

The ratio of the pressure forces relative to the inertial forces is typically selected to be 2. However, the ratio can for example vary between 0.5 to 5.

This requirement may be stated in more tangible detail by expressing it as an arithmetic expression relating the principal variables. This is for the condition where the pumping chamber 14 is actuated cyclically at 50 Hertz. This expression pertains only to a spherical form of the inlet control member, but it is obvious to those skilled in mathematics to relate the expression to other geometrical forms of the inlet control member, such as cylindrical member, such as cylindrical, disk-like or spool-shaped forms.

The density of a spherical inlet control member 15 in units of kilograms per cubic meter is selected to be typically twenty five times the reciprocal of the diameter of the sphere in units of meters.

$$\rho \approx 25/d$$

It may be appreciated that the shape of the inlet control member may be modified in order to achieve a mass satisfying the notional density requirement for a spherical shape as expressed in the equation.

In order that air or vapour be separated from the fluid by buoyancy forces, the following concomitantly applies, as outlined in the next paragraph.

(D) THE AREA OF THE INLET DUCT

The area of the inlet duct 8 must be sufficiently great so that the buoyancy forces affecting air or vapour bubbles at the inlet of the pump may overcome the viscous and other opposing forces due to the entraining flow of fluid into the pump inlet control means 23. The velocity of fluid in the inlet duct 8 must be less than the velocity of average-sized bubbles rising under the action of buoyancy forces.

In practical terms, given the effects of surface tension, it is difficult to provide a non-dimensional ratio. Typically, the diameter of the inlet duct 8 will be larger than five millimeters for any fuel pump, no matter how small. A more optimum value may be eight millimeters diameter.

Typically, the cross-sectional area of the inlet duct 8 relative to the aforementioned projected area of the inlet control member 15 is in a ratio of five to one. That is, a typical ratio is five. However, the ratio can for example lie within the range of two to ten. The typical value is five.

The above four sets of ratios "A", "B", "C" and "D" are determined to enable the inlet control means 23 to operate in the desired manner. That is, when fluid predominantly comprising gas and/or vapour is present in the pumping chamber 14, the inlet control member 15 is caused to oscillate out of phase with the fluid passing in and out of the pumping chamber to effectively purge the pump of gas/vapour. However if fluid predominately comprising liquid is present in the pumping chamber 14 the inlet control member 15 is caused to oscillate 'in-phase' with the fluid passing in and out of the pumping chamber allowing the pump to therefore operate effectively to pump the liquid through the discharge control means.

The effective design of the inlet control means therefore provides for a pump with good priming and hot 'fuel handling' capabilities.

The above description is provided for the purposes of exemplification only and it will be understood by the person skilled in the art that modifications and variations may be made without departing from the invention.

What is claimed is:

1. A pump for pumping fluid including:

a pump body having a pumping chamber therein;

an inlet control means adapted to be in fluid communication with a fluid supply means upstream of said inlet control means for supplying fluid to the pump;

and an outlet control means adapted to control the delivery of fluid from the pump;

wherein when a fluid at least substantially consisting of gas or vapour is supplied to the pumping chamber through the inlet control means, the fluid is pumped upstream from the inlet control means, and when a fluid at least substantially consisting of liquid is supplied to the pumping chamber through the Inlet control means, the fluid is at least substantially pumped through the outlet control means.

2. A pump according to claim 1, wherein the pump is a fuel pump arranged to receive fuel from a fuel supply means and to pump fuel through the outlet control means.

3. A pump according to claim 1, wherein the pump is adapted to reject vapour continuously during steady state operation of the pump.

4. A pump according to claim 2, wherein the inlet control means includes an inlet control member for controlling the flow of at least one of fuel and gas to and from the pumping chamber.

5. A pump according to claim 4, wherein the inlet control member is accommodated within an inlet bore having an inlet port at one end thereof, and an end stop face at an opposing end thereof, the inlet control member being freely moveable within the inlet bore between the inlet port and the end stop face of the inlet bore.

6. A pump according to claim 5, wherein at least one inlet discharge passage extends between the end stop face of the inlet bore and the pumping chamber to allow the flow of fluid to and from the inlet bore and the pumping chamber.

7. A pump according to claim 6, wherein the at least one discharge passage is offset relative to the central position of the inlet control member such that flow though the at least one discharge passage still occurs when the inlet control member abuts the end stop face.

8. A pump according to claim 5, wherein the inlet control member is spherical in shape and the inlet port is provided with a valve seat upon which the inlet control member can abut to close off the inlet port thereby preventing fluid flow through the inlet bore.

9. A pump according to claim 5, wherein when fluid at least predominately of at least one of gas and vapour is supplied to the pumping chamber, the inlet control member oscillates out of phase with the fluid flow into and out of the pumping chamber, and when,fluid at least predominately of liquid is supplied to the pumping chamber, the inlet control member generally oscillates in phase with the fluid flow into and out of the pumping chamber.

10. A pump according to claim 5, wherein a clearance is provided between the internal walls of the inlet bore and the inlet control member, and a predetermined axial travel is provided for the inlet control member within the inlet bore, the clearance and the stroke being a function of the diameter of the inlet control member.

11. A pump according to claim 10, wherein the diametral clearance is equal to one tenth the diameter of the inlet control member.

12. A pump according to claim 5, wherein the ratio of the volumetric change of the pumping chamber per stroke event relative to a theoretical volume swept by the inlet control member per corresponding stroke event in travelling between limiting positions thereof is approximately twenty to one.

13. A pump according to claim 5, wherein the ratio of the pressure forces applied to the inlet control member by the fluid flow and the inertia force required to be applied to the inlet control member to move said member between limiting positions thereof is between 0.5 to 5.

14. A pump as in any of claims 5 to 12, wherein the ratio of the pressure forces applied to the inlet control member by the fluid flow and the inertia force required to be applied to the inlet control member to move said member between limiting positions thereof is approximately 2.

15. A pump according to claim 5, wherein the ratio of the cross-sectional area of the inlet duct relative to a projected area of the inlet control member is between 2 to 10.

16. A pump as in any of claims 5 to 12, wherein the ratio of the cross-sectional area of the inlet duct relative to a projected area of the inlet control member is approximately 5.

17. A pump according to claim 5, wherein an inlet filter screen is provided within an inlet duct upstream of the inlet port and downstream of the fuel supply means.

18. A pump according to claim 2, wherein the fuel pump further includes a fluid discharge means for delivering fuel which is pumped through the outlet control means to a desired source.

19. A pump according to claim 18, wherein the outlet control means includes a check valve means responsive to the pressure in the pumping chamber for controlling the flow of fuel from the pumping chamber.

20. A pump according to claim 1, further including a piston located within the pumping chamber, the piston being actuated by an eccentrically mounted cam.

21. A pump according to claim 20, wherein bearing means is provided about the cam for engaging one end of the piston.

22. A pump according to claim 21, wherein the bearing means is in the form of a sleeve bearing on a follower supported on or integral with the piston.

23. A pump according to claim 1, wherein the fuel supply means is a fuel reservoir, and an upstream supply line connects the inlet control means via the inlet duct to the fuel reservoir.

24. A pump according to claim 23, wherein the upstream supply line is directly submerged within the fuel reservoir.

25. A pump according to claim 23, wherein the upstream line is contained within a hose connected to a fuel reservoir located directly above the fuel pump.

26. A pump according to claim 23, wherein the fuel pump is entirely submerged within the fuel reservoir and draws fuel from the upstream fuel supply line such that the fuel pump then subsequently delivers high pressure fuel via the fluid discharge means to a downstream fuel supply circuit located externally to the fuel reservoir.

27. A pump for pumping fluid including:

a pump body having a pumping chamber therein;

an inlet control means adapted to being fluid communication with a fluid supply means upstream of said inlet control means for supplying fluid to the pump, said inlet control means including an inlet control member for controlling the flow of at least one of fuel and gas to and from the pumping chamber, said inlet control member is accommodated within an inlet bore having an inlet port at one end thereof, and an end stop face at an opposing end thereof, the inlet control member being freely moveable within the inlet bore between the inlet port and the end stop face of the inlet bore;

an outlet control means adapted to control the delivery of fluid from the pump; and at least one inlet discharge passage extending between the end stop face of the inlet bore and the pumping chamber to allow the flow of fluid to and from the inlet bore and the pumping chamber;

wherein when a fluid at least substantially consisting of gas or vapour is supplied to the pumping chamber through the inlet control means, the fluid is pumped upstream from the inlet control means, when a fluid at least substantially consisting of liquid is supplied to the pumping chamber through the inlet control means, the fluid is at least substantially pumped through the outlet control means, and when a fluid at least predominantly of at least one of gas and vapour is supplied to the pumping chamber, the inlet control member oscillates out of phase with the fluid flow into and out of the pumping chamber, and when a fluid at least predominantly of liquid is supplied to the pumping chamber, the inlet control member generally oscillates in phase with the fluid flow into and out of the pumping chamber.

28. A pump according to claim 27, wherein the at least one discharge passage is offset relative to the central position of the inlet control member such that flow through the at least one discharge passage still occurs when the inlet control member abuts the end stop face.

29. A pump according to claim 27, wherein the inlet control member is spherical in shape and the inlet port is provided with a valve seat upon which the inlet control member can abut to close off the inlet port thereby preventing fluid flow through the inlet bore.

30. A pump according to claim 27, wherein a clearance is provided between the internal walls of the inlet bore and the inlet control member, and a predetermined axial travel is provided for the inlet control member within the inlet bore, the clearance and the stroke being a function of the diameter of the inlet control member.

31. A pump according to claim 30, wherein the diametral clearance is equal to one tenth the diameter of the inlet control member.

32. A pump according to claim 27, wherein the ratio of the volumetric change of the pumping chamber per stroke event relative to a theoretical volume swept by the inlet control member per corresponding stroke event in traveling between limiting positions thereof is approximately twenty to one.

33. A pump according to claim 27, wherein the ratio of the pressure forces applied to the inlet control member by the fluid flow and the inertia force required to be applied in the inlet control member to move said member between limiting positions thereof is between 0.5 to 5.

34. A pump according to claim 27, wherein the ratio of the cross-sectional area of the inlet duct relative to a projected area of the inlet control member is between 2 to 10.

35. A pump according to claim 27, further including a piston located within the pumping chamber, the piston being actuated by an eccentrically mounted cam.

* * * * *